United States Patent [19]

Corbett

[11] Patent Number: 4,926,776
[45] Date of Patent: May 22, 1990

[54] VERTICALLY ADJUSTABLE FLOATING DOCK

[76] Inventor: Reg D. Corbett, 23116 Roberts Run, Bay Village, Ohio 44140

[21] Appl. No.: 49,830

[22] Filed: May 15, 1987

[51] Int. Cl.$^5$ .............................................. B63C 1/02
[52] U.S. Cl. .................................. 114/263; 114/266; 405/219
[58] Field of Search ................. 114/61, 263, 264, 266, 114/123, 292; 14/2.6, 27, 28; 405/219, 221

[56] References Cited

U.S. PATENT DOCUMENTS

| | | | |
|---|---|---|---|
| 745,192 | 11/1903 | Kampmann | 14/27 |
| 1,700,153 | 1/1929 | Bradley | 114/263 |
| 1,871,475 | 8/1932 | Smith | 114/263 |
| 3,102,503 | 9/1963 | Sheffield | 114/61 |
| 3,397,546 | 8/1968 | Eisert et al. | 14/28 |
| 3,455,115 | 7/1969 | Watts et al. | 405/219 |
| 3,473,502 | 10/1969 | Wittkamp | 114/61 |
| 3,726,098 | 4/1973 | Alms et al. | 114/266 |
| 3,857,352 | 12/1974 | Schott | 114/61 |
| 4,191,479 | 3/1980 | Shuck et al. | 114/264 |

FOREIGN PATENT DOCUMENTS 7903666 11/1980 Netherlands .................. 114/61

Primary Examiner—Sherman D. Basinger
Assistant Examiner—Thomas J. Brahan
Attorney, Agent, or Firm—J. Helen Slough

[57] ABSTRACT

Vertically adjustable floating dock units for mooring boats are adapted to be vertically adjustable relative to the water line. The floating dock unit contains a detachable pontoon mounting assembly to which pontoons are secured and the assembly is removably secured to the dock understructure at variable vertical height adjustments.

2 Claims, 4 Drawing Sheets

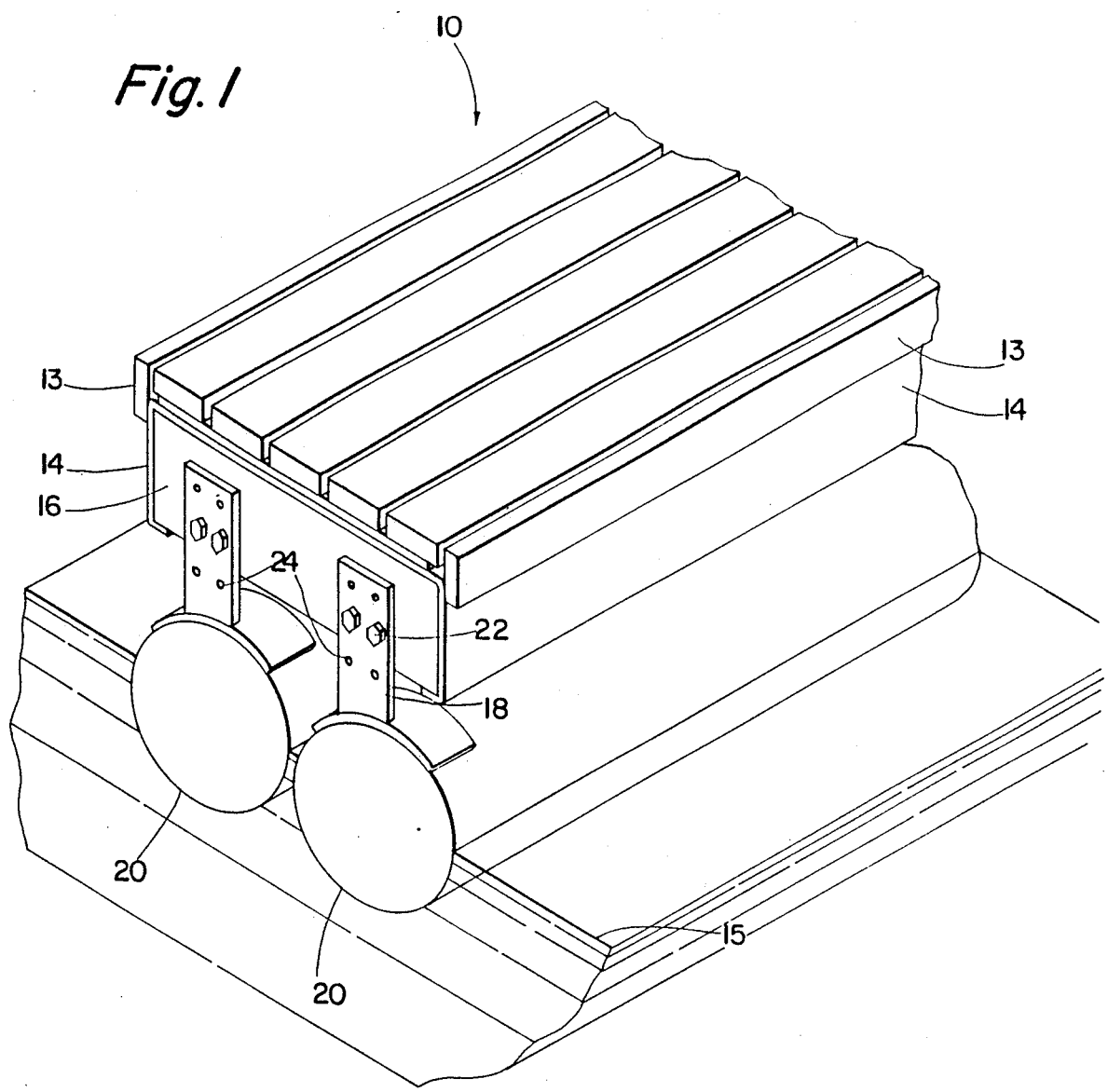

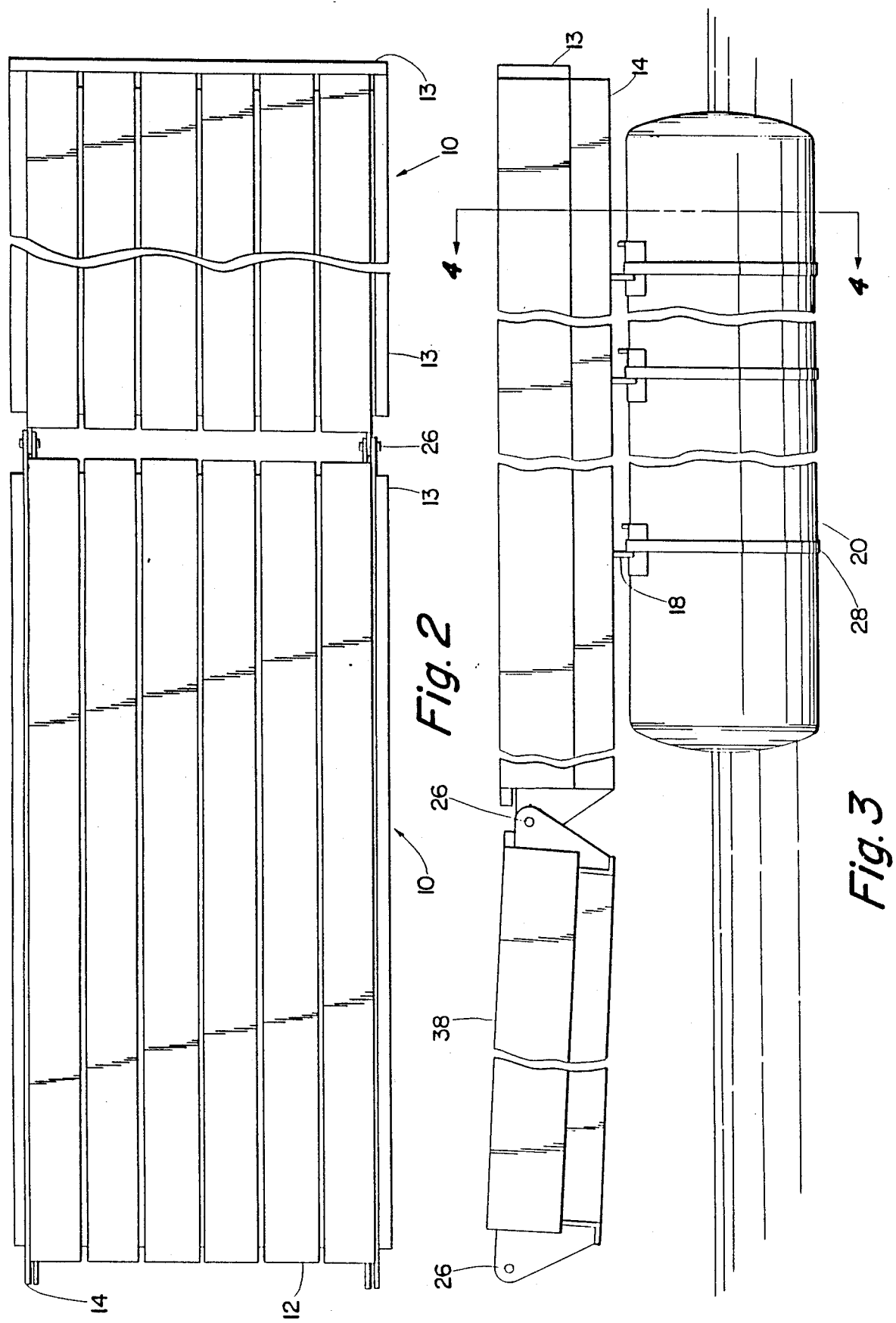

VERTICALLY ADJUSTABLE FLOATING DOCK

BACKGROUND OF THE INVENTION

This invention pertains to floating dock systems and particularly to vertically adjustable floating docks adapted to be vertically adjustable relative to the water line as well as easily assembled for use or easily dismantled for storage.

Various floating dock systems are known and include, for example: U.S. Pat. No. 3,283,517 disclosing a dock equipped with cylindrical float means carried on an elongated pipe axle adapted to act as wheels moving the dock over land; U.S. Pat. No. 3,726,098 disclosing floating docks containing rod connectors interconnecting adjacent dock sections to prevent tipping or undesirable pivotal motion between the adjacent modules in addition to securing the dock in substantially horizontally fixed relation to the bottom of the body of water; U.S. Pat. No. 3,643,448 disclosing a floating landing stage having complex vertically operative jetty guide means adapted to engage float means functional to permit the floating dock to rise and fall with the changing water level as well as acting to prevent lateral movement of the floating docks; U.S. Pat. No. 3,455,115 disclosing a system of modular dock sections containing a plurality of cylindrical floatation elements secured by straps to the underside of each module to stabilize the same against tipping and to maintain horizontal positioning thereof despite changes in water level; U.S. Pat. No. 3,763,808 disclosing floatation modules interconnected with an intermediate flexible coupling platform adapted to permit limited flexing between adjacent units.

It now has been found that floating dock units can be easily assembled to form a vertically adjustable floating dock without the necessity of raising or lowering the dock surface relative to the water level with the assistance of mechanical vertical adjustment means resting on the river bottom. In accordance with this invention, an upper dock structure including supporting undercarriage is removably attached to flotation units or pontoons. Preferably the undercarriage is a C-shaped girder adapted to improve the overall strength of each dock unit. The floating dock is vertically adjustable by means of a removable vertically adjustable mount comprising an upright vertical plate having a plurality of interconnecting bolt holes adapted to interconnect with a similar pair of bolt holes disposed in the understructure of each dock unit to provide variable adjustable heights of the deck surface relative to the water line. The adjustable pontoon mount includes a lower saddle structure preferably contoured and adapted to engage the contour of the periphery of each pontoon whereby each pontoon is strapped or otherwise secured to the contoured support. Means are provided to prevent the strapping or other securing means from slipping off the lateral support. Accordingly, the entire pontoon assembly including the saddle secured to the pontoons can be vertically adjusted by merely removing the connecting bolts or other removable securing means, adjusting the pontoon assembly either upwardly or downwardly by securely bolting or otherwise securing the saddle in its adjusted position under the floating dock. These and other advantages will become more readily apparent by referring to the drawings and detailed description of the invention.

IN THE DRAWINGS:

FIG. 1 is a perspective view of the vertically adjustable floating dock unit in accordance with this invention showing flotation pontoons floating in water partially below the water line;

FIG. 2 is a top plan view of the floating dock unit in FIG. 1 showing a ramp section secured thereto;

FIG. 3 is a side elevational view of one of the floating dock units shown in FIG. 2 and an entrance ramp on the left;

SUMMARY OF THE INVENTION

Figure 4:
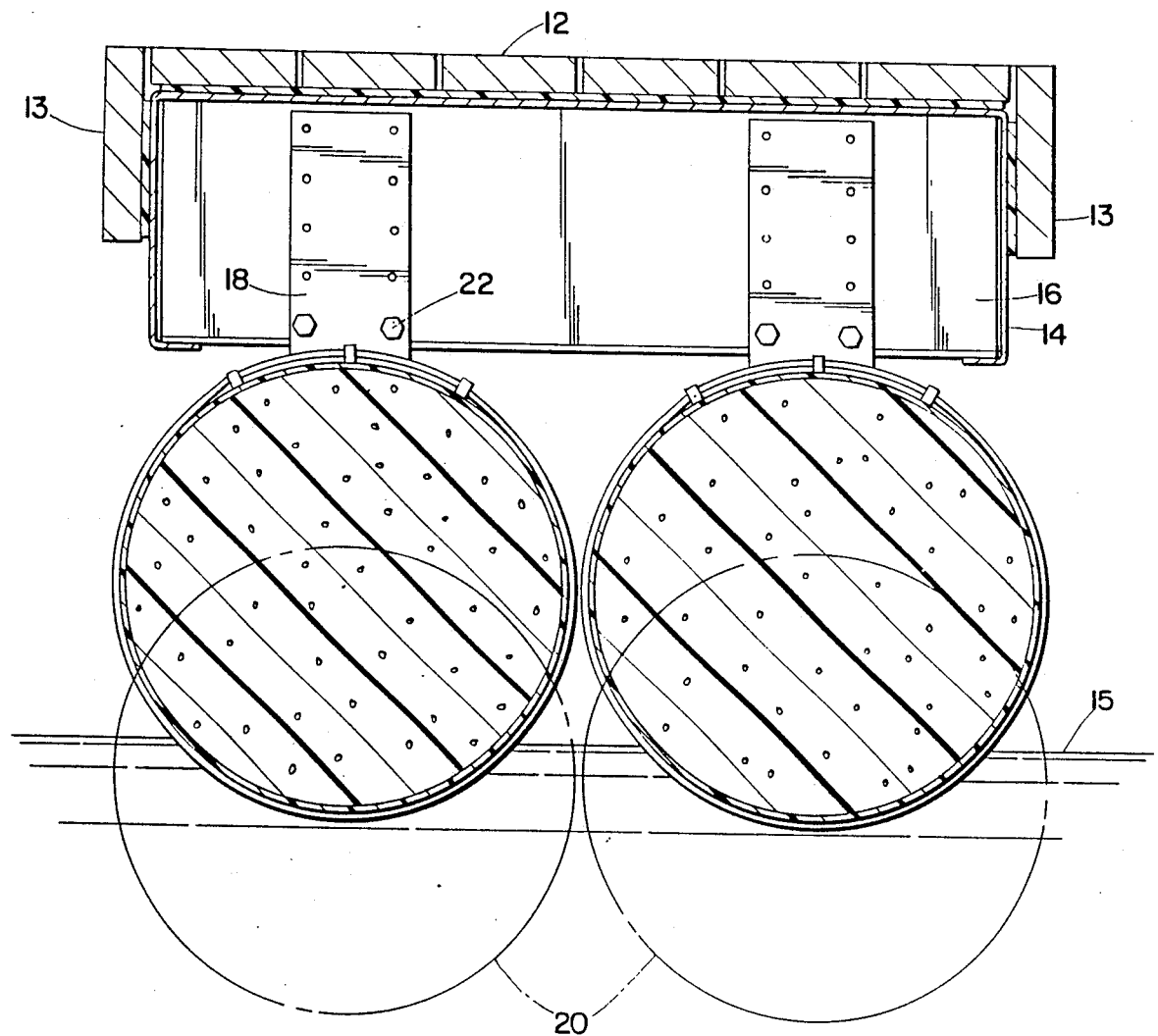
FIG. 4 is a sectional elevational View taken along the lines 4—4 of FIG. 3.

Briefly, the vertically adjustable dock of this invention comprises an upper dock and understructure adapted to be easily removed or adjusted relative to a flotation or pontoon system. The adjustable mounting assembly for interconnecting the pontoon system and the upper dock assembly includes removable securing means, such as removable bolt connectors, whereby the bolts can be removed to accommodate a height adjustment of the pontoon system relative to upper dock structure. Various other adjustable means may be employed other than the bolts shown herein.

DETAILED DESCRIPTION OF THE INVENTION

Referring now to the drawings wherein like reference characters designate like parts, in FIG. 1 is shown an adjustable floating dock unit 10 in accordance with this invention floating in Water indicated by the water line 15.

The floating dock unit 10 illustrated includes an upper deck 12 preferably comprising a plurality of upper linearly disposed top slats 12 along with similar side slats 13 supported by and secures to a unitary C-shaped metal girder 14. The dock unit can be formed of slats 12 and 13 or other preferred decking and provided with painted or other surfaces and the same can be pine or other wood, or metal such as aluminum or the like provided with channels as shown. A reinforcing transverse frame member 16 is welded or otherwise secured transversely within the open front and rear C-sections of the unitary girder 14. The upper deck section of the floating dock 10 is supported by flotation units preferably comprising a pair of foam filled cylindrical shaped pontoons 20. The pontoons 20 are each strapped or otherwise secured to a vertically adjustable pontoon mount which comprises an upright mounting plate 18 secured to a curved saddle member 19 contoured to engage the cylindrical outer periphery of the pontoon 20. The adjustable pontoon mounting plate 18 is secured to the transverse frame member 16 with a pair of laterally spaced removable bolts or connector means 22 or similar fastener means adapted to be projected through similarly spaced bolt holes 25 or functionally equivalent connection means provided in the transverse member 16. The flotation pontoons 20 can contain plastic foam such as polyethylene, polyurethane or polystyrene or similar polymeric foam encased within a waterproof skin. It can be readily seen that the vertically adjustable mounting assembly can be adjusted upwardly or downwardly as desired relative to the vertical bolt holes 24 in plate 18 by removing the pair of bolts 22, vertically adjusting the upright plate 18 either upwardly or downwardly in alignment with a different pair of vertically spaced bolt holes or bolt adapters 25 in transverse member 16, and tightening the bolts 22 within the said different bolt holes 24, as best viewed in FIGS. 4 and 5.

Referring next to FIG. 2, two adjustable floating dock units 10 are shown pivotally interconnected in tandem at pivot connection 26 adapted to rotate or pivot about pivot connection 26 in response to minor water level disturbances. Each pontoon 20 is secured to the depending pontoon mount assembly plate 18 and contoured saddle 19 preferably by a circumferential strap 28 peripherally encircling the outer cylindrical surface of each pontoon 20. As shown, FIG. 4 is a side elevational view of one of the adjustable floating dock units 10 shown in FIG. 3 employed with an entrance ramp 38 or similar connecting ramp and the ramp lacks a flotation unit. The ramp 38 can provide entrance connection with a landing ground or provide an interconnection between the adjustable floating dock units 10.

In FIG. 4, upward adjustment is shown in solid lines and downward adjustment in phantom lines and discloses the means whereby the height of the upper deck surface 12 can be vertically adjusted relative to the water line 15 as the vertical adjustment may be desired. Accordingly the pontoon 20' shown in phantom lines in FIG. 4 corresponds to the largest vertical adjustment of the pontoon mount assembly in accordance with this invention.

Figure 5:
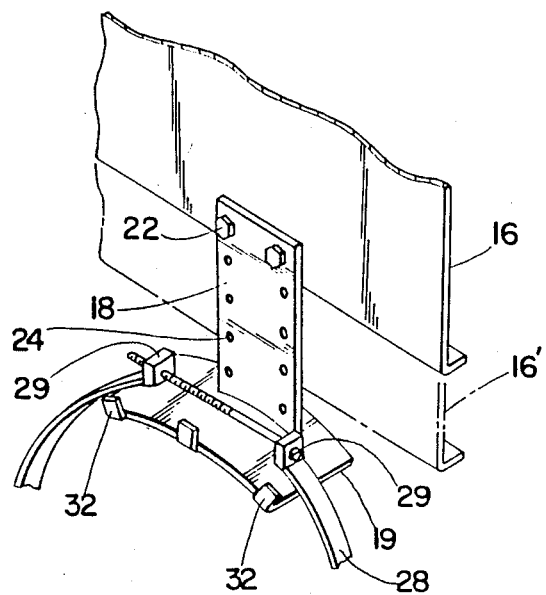
FIG. 5 is an enlarged perspective view of the adjustable pontoon mount assembly for vertically adjusting the floating dock surface in FIG. 1 relative to the water line, the dock section being partially shown.

As shown in FIG. 5, which is a considerably enlarged perspective view of the vertically adjustable pontoon mounting assembly, the upright plate 18 is shown in a lowermost adjustment position relative to the transverse member 16 shown in solid lines. Removable bolts or connector means 22 are disposed through the uppermost pair of bolt holes 24 in upright plate 18 and secured to transverse member 16. The uppermost vertical adjustment of upright plate 18 is similarly shown in phantom lines. Shown in more detail is the strapping connection comprising the circumferential metal strap 28 having spaced distal ends 29 compressively secured together with a threaded tightening rod 30 to tightly secure each pontoon 20 to the curved saddle 19 of the mounting plate. The saddle 19 is, as shown, further provided with a stop means comprising a plurality of upwardly extending stops 32 on the outside curved periphery of the curved saddle 19 to prevent the strapping means from slipping off the curved saddle structure 19.

Figure 6:
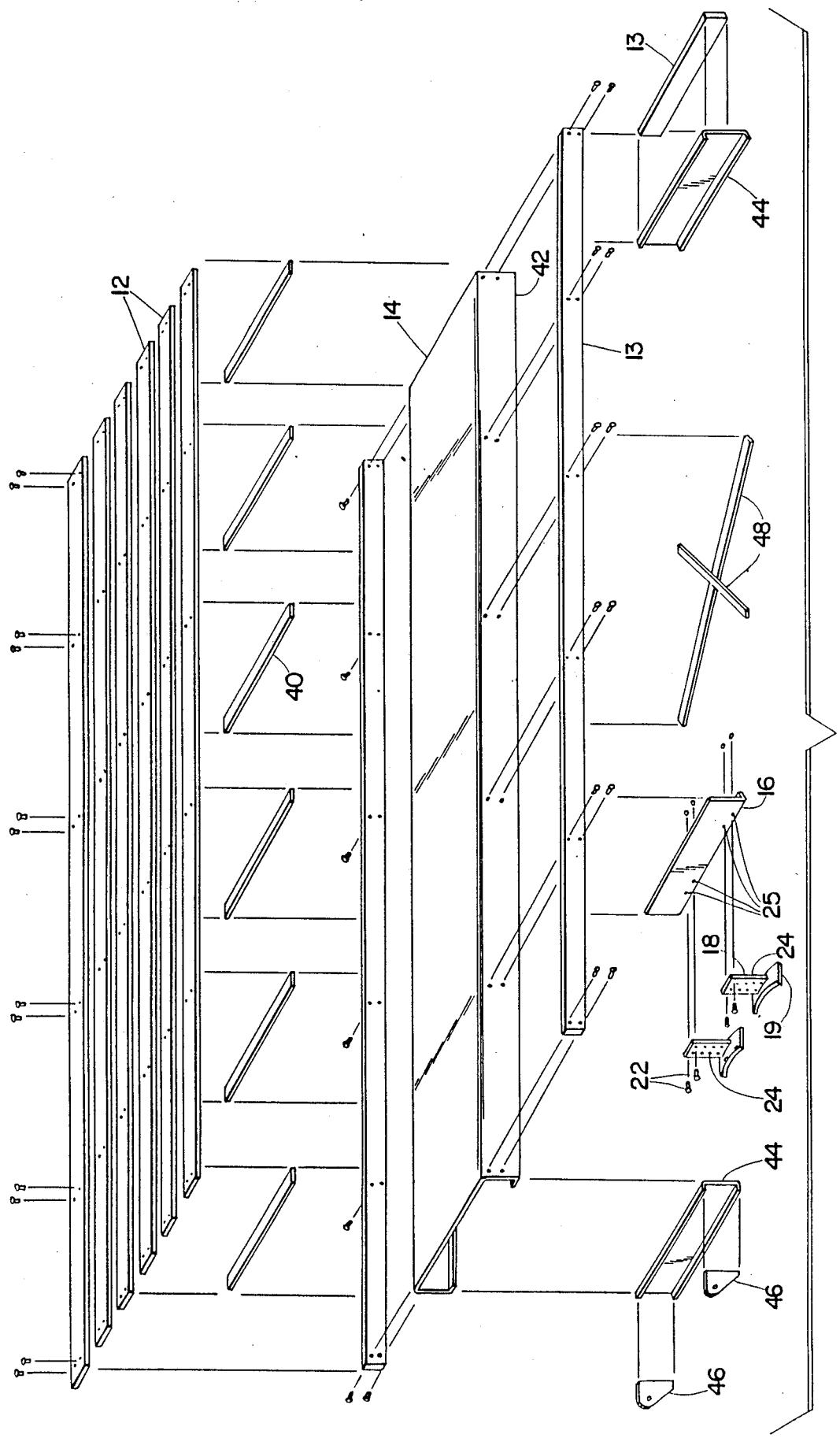
FIG. 6 is an exploded assembly view of the understructure of the floating dock shown in FIG. 1.

Referring next to FIG. 6, the upper dock structure is shown in detail in an exploded assembly view. The plurality of upper deck slats 12 are shown bolted or otherwise secured to transverse braces 40 which in turn are welded or otherwise secured to the top surface of the C-shaped unibody girder 14. The girder 14 is provided with depending side channels 42 to which side deck slats 13 are secured. The understructure of the C-shaped girder 14 as shown is further provided with reinforcing rods 48 to provide a reinforced structural truss construction to further strengthen the underside of girder 14. At both the rearward and forward ends of the C-shaped girder 14 end cap support members 44 are secured. The rearward end cap member 44 has a rearwardly extending side mounted deck slot 13 and the forward end cap member 44 is shown to have a pair of side mounted deck slat 13 and the forward end cap member 44 is shown to have a pair of pivot brackets 46 welded thereto. The pivot brackets 46 are adapted to be pivotally connected by pivotal connection 26, previously described, to a similar pair of pivot brackets 46 secured on an adjacent floating dock unit 10.

As further shown in FIG. 6 a transverse frame member 16 is bolted or otherwise secured between the depending side channels 42 of the C-shaped channel 14. Each transverse frame member 16 as shown contains two pairs of bolt holes 25 wherefor each pair receives the bolts 22 thus securing the adjustable pontoon mounting assembly comprising the upright plate 18 and the curved saddle 19 to the dock. Although only one adjustable pontoon mounting assembly is shown in FIG. 6, one or several more such assemblies can be similarly mounted depending on the length of the floating dock unit 10. In more detail, each pontoon mounting assembly is vertically adjustable by locating a lateral pair of bolt holes 24 of the several pairs spaced vertically in the upright plate 18 in alignment with the pair of bolt holes 25 in transverse frame member 16 and securing the plate 18 and the transverse member 16 together by bolt means 22 passed through aligned bolt holes 24 and 25. Although the transverse frame member 16 is shown as containing fixed alignment bolt holes 25, it is readily seen that vertical adjustment can be effected by providing a plurality of vertically spaced pairs of bolt holes 25 adapted to permit vertical adjustment of the upright plate 18 relative to the transverse frame member 16.

In use, the adjustable floating dock 10 can be easily assembled by strapping preferably a pair of foam filled pontoons 20 to the under carriage of the upper deck construction and merely involves strapping the pontoons to the curved saddle 19 by strap 29 and tightly securing the distal ends 29 thereof with a tightening rod 30. The pontoons can thus be permanently secured to the saddle 19 of the vertically adjustable mount assembly if desired and vertical adjustment in accordance with this invention can be effected by adjusting the mount assembly strapped to the pontoons 20 as a unit. If the pontoons 20 need replacement or repair, the strapped unit can be easily disassembled, repaired, and again assembled.

As noted hereinbefore, the pontoons 20 strapped to the saddle 19 of the pontoon mount assembly can be easily lowered or raised as a unit by merely the removal of the bolts 22 during the vertical adjustment operation. A new vertical height is selected by aligning a new pair of bolt holes 24 in upright brace 18 with bolt holes 25 and once again securely bolting the upright brace 18 to the transverse member 16.

Although preferred embodiments of this invention directed to a vertically adjustable floating dock have been shown in the drawings and described, the scope of the invention is not intended to be limiting except in the appended claims.

What I claim is:

1. A vertically adjustable floating dock unit adapted to float in water and be vertically adjustable relative to the water line, the floating dock unit comprising:

an upper dock structure having an upper dock surface and a downwardly depending transverse frame member, a vertically adjustable mounting assembly, connector means for removably connecting the mounting assembly to the downwardly depending transverse frame member, and a flotation unit secured to the adjustable mounting assembly in spaced relation to transverse frame member whereby the flotation unit is adapt to float in water and support the upper dock structure above the water line;

said mounting assembly comprising an upright member adapted to be removably secured to the downwardly depending transverse frame member and a saddle structure adapted to be secured to and engage an upper surface of the flotation unit;

said vertically adjustable mounting assembly being vertically adjustable relative to the upper dock structure to provide variable height adjustment differentials of the dock surface relative to the water line;

said flotation unit comprises a pair of pontoons and each adjustable mounting assembly includes a saddle member adapted to be secured to one of said pontoons;

each said pontoon is secured to the saddle member by a strapping means and each said pontoon is substantially cylindrically;

said saddle member contains a stop means adapted to prevent the strapping means from slipping off of the saddle means.

2. A vertically adjustable floating dock unit adapted to float in water and be vertically adjustable relative to the water line, the floating dock unit comprising:

an upper dock structure having an upper dock surface and a downwardly depending transverse frame member, a vertically adjustable mounting assembly, connector means for removably connecting the mounting assembly to the downwardly depending transverse frame member, and a flotation unit secured to the adjustable mounting assembly in spaced relation to the transverse frame member whereby the flotation unit is adapted to float in water and support the upper dock structure above the water line;

said mounting assembly comprising an upright member adapted to be removably secured to the downwardly depending transverse frame member and a saddle structure adapted to be secured to and engage an upper surface of the flotation unit;

said vertically adjustable mounting assembly being vertically adjustable relative to the upper dock structure to provide variable height adjustment differentials of the dock surface relative to the water line;

said flotation unit comprises a pair of pontoons and each adjustable mounting assembly includes a saddle member adapted to be secured to one of said pontoons;

each said pontoon is secured to the saddle member by a strapping means and each said pontoon is substantially cylindrically;

said saddle member contains a stop means adapted to prevent the strapping means from slipping off of the saddle means;

the said stop means comprised of upward directed vertical stops.

* * * * *